United States Patent
Nagai et al.

(10) Patent No.: US 11,556,933 B2
(45) Date of Patent: Jan. 17, 2023

(54) MONEY HANDLING SYSTEM, MONEY HANDLING APPARATUS, CENTER APPARATUS, AND FRAUD DETECTING METHOD FOR MONEY HANDLING APPARATUS

(71) Applicant: Glory Ltd., Himeji (JP)

(72) Inventors: Takakazu Nagai, Himeji (JP); Yoshirou Oie, Himeji (JP); Shingo Katahira, Himeji (JP)

(73) Assignee: GLORY LTD., Himeji (JP)

( * ) Notice: Subject to any disclaimer, the term of this patent is extended or adjusted under 35 U.S.C. 154(b) by 73 days.

(21) Appl. No.: 16/878,634

(22) Filed: May 20, 2020

(65) Prior Publication Data

US 2020/0279268 A1    Sep. 3, 2020

Related U.S. Application Data

(63) Continuation of application No. PCT/JP2018/040876, filed on Nov. 2, 2018.

(30) Foreign Application Priority Data

Nov. 20, 2017 (JP) .............................. JP2017-222510

(51) Int. Cl.
*G06Q 40/00* (2012.01)
*G06Q 20/40* (2012.01)
(Continued)

(52) U.S. Cl.
CPC ....... *G06Q 20/4016* (2013.01); *G06Q 20/108* (2013.01); *G06Q 20/18* (2013.01)

(58) Field of Classification Search
CPC ... G06Q 20/4016; G06Q 20/108; G06Q 20/18
See application file for complete search history.

(56) References Cited

U.S. PATENT DOCUMENTS 8,478,020 B1 * 7/2013 Jones .................... G07F 19/207
                                                        382/137
9,710,990 B1   7/2017 Liu
(Continued)

FOREIGN PATENT DOCUMENTS

DE    19824435 A1   12/1999
EP     3267403 A1    1/2018
(Continued)

OTHER PUBLICATIONS

Anonymous, "Cassette Swapping," GRG Banking, 2010 (Year: 2010).*

(Continued)

*Primary Examiner* — Alexander G Kalinowski
*Assistant Examiner* — William B. Bunker
(74) *Attorney, Agent, or Firm* — Xsensus LLP

(57) ABSTRACT

Circuitry acquires, when predetermined money handling is executed, stored money information including specific information of money stored in a storage before execution of the money handling and money transfer information including specific information of money transferred in execution of the money handling, determines, based on the stored money information and the money transfer information, a presence or absence of an occurrence of an abnormality related to money in the money handling apparatus and generates, in a case that it is determined that there is the presence of the occurrence of the abnormality, fraud data related to the occurrence of the abnormality.

12 Claims, 10 Drawing Sheets

STORED MONEY INFORMATION

| STORAGE | DENOMINATION-CATEGORIZED STORAGE 1 | | DENOMINATION-CATEGORIZED STORAGE 2 | | DENOMINATION-CATEGORIZED STORAGE 3 | | MIXED STORAGE | |
|---|---|---|---|---|---|---|---|---|
| DENOMINATION | 1,000 YEN | | 5,000 YEN | | 10,000 YEN | | MIXED | |
| NUMBER OF BANKNOTES | 150 | | 80 | | 270 | | 120 | |
| AMOUNT OF MONEY | 150,000 YEN | | 400,000 YEN | | 2,700,000 YEN | | (OMITTED) | |
| SERIAL NUMBER LIST | 1 | A00001 | 1 | B00001 | 1 | C00001 | 1 | A10001 |
| | 2 | A00002 | 2 | B00002 | 2 | C00002 | 2 | B10002 |
| | 3 | A00003 | 3 | B00003 | 3 | C00003 | 3 | A10003 |
| | 4 | A00004 | 4 | B00004 | 4 | C00004 | 4 | D00004 |
| | 5 | A00005 | 5 | B00005 | 5 | C00005 | 5 | C10005 |
| | : | : | : | : | : | : | : | : |
| | | | 80 | B00080 | : | : | : | : |
| | : | : | | | : | : | 120 | A10120 |
| | 150 | A00150 | | | : | : | | |
| | | | | | : | : | | |
| | | | | | 270 | C00270 | | |

(51) Int. Cl.
*G06Q 20/10* (2012.01)
*G06Q 20/18* (2012.01)

(56) References Cited

U.S. PATENT DOCUMENTS

| | | | | |
|---|---|---|---|---|
| 2003/0046232 | A1* | 3/2003 | Peters | G06Q 20/18 705/43 |
| 2006/0043167 | A1* | 3/2006 | Fujioka | G07F 19/202 235/379 |
| 2012/0259870 | A1* | 10/2012 | Mahesh | G06F 16/256 707/752 |
| 2014/0039673 | A1* | 2/2014 | Sakamoto | G07D 11/24 700/244 |
| 2014/0040085 | A1* | 2/2014 | Angus | G07D 11/12 705/35 |
| 2014/0144976 | A1* | 5/2014 | Angus | G07D 7/003 235/375 |
| 2015/0154473 | A1 | 6/2015 | Shimakata et al. | |
| 2015/0170454 | A1* | 6/2015 | Sasaki | G06Q 40/00 382/135 |
| 2016/0335614 | A1 | 11/2016 | Norota | |
| 2018/0247480 | A1* | 8/2018 | Numata | G07D 11/16 |

FOREIGN PATENT DOCUMENTS

| | | | | |
|---|---|---|---|---|
| JP | 2010-157179 | A | 7/2010 | |
| JP | 2014-016856 | A | 1/2014 | |
| JP | 5606711 | B2 | 10/2014 | |
| JP | 2014-228904 | A | 12/2014 | |
| JP | 2015-191331 | A | 11/2015 | |
| JP | 2016-085569 | A | 5/2016 | |
| WO | WO-2006063555 | A1 * | 6/2006 | G07D 11/0006 |
| WO | 2015/114746 | A1 | 8/2015 | |
| WO | WO-2015114746 | A1 * | 8/2015 | G07D 11/12 |
| WO | WO-2016063562 | A1 * | 4/2016 | G06Q 20/18 |
| WO | 2016/140141 | A1 | 9/2016 | |

OTHER PUBLICATIONS

Anonymous, "It all comes bank to the cash . . . cassette, that is," ATM Marketplace, 2010 (Year: 2010).*
Extended European search report dated Dec. 23, 2020, in corresponding European patent Application No. 18877855.9, 7 pages.
International Search Report and Written Opinion dated Feb. 5, 2019 for PCT/JP2018/040876 filed on Nov. 2, 2018, 10 pages including English Translation of the International Search Report.

* cited by examiner

FIG.3

STORED MONEY INFORMATION

| STORAGE | DENOMINATION-CATEGORIZED STORAGE 1 | | DENOMINATION-CATEGORIZED STORAGE 2 | | DENOMINATION-CATEGORIZED STORAGE 3 | | MIXED STORAGE | |
|---|---|---|---|---|---|---|---|---|
| DENOMINATION | 1,000 YEN | | 5,000 YEN | | 10,000 YEN | | MIXED | |
| NUMBER OF BANKNOTES | 150 | | 80 | | 270 | | 120 | |
| AMOUNT OF MONEY | 150,000 YEN | | 400,000 YEN | | 2,700,000 YEN | | (OMITTED) | |
| SERIAL NUMBER LIST | 1 | A00001 | 1 | B00001 | 1 | C00001 | 1 | A10001 |
| | 2 | A00002 | 2 | B00002 | 2 | C00002 | 2 | B10002 |
| | 3 | A00003 | 3 | B00003 | 3 | C00003 | 3 | A10003 |
| | 4 | A00004 | 4 | B00004 | 4 | C00004 | 4 | D00004 |
| | 5 | A00005 | 5 | B00005 | 5 | C00005 | 5 | C10005 |
| | : | : | : | : | : | : | : | : |
| | | | 80 | B00080 | : | : | : | : |
| | : | : | | | : | : | 120 | A10120 |
| | 150 | A00150 | | | : | : | | |
| | | | | | : | : | | |
| | | | | | 270 | C00270 | | |

FIG.4

MONEY TRANSFER INFORMATION

| No. | SERIAL NUMBER | TRANSFER SOURCE | TRANSFER DESTINATION |
|---|---|---|---|
| 1 | A10001 | MIXED | DENOMINATION 1 |
| 2 | B10002 | MIXED | DENOMINATION 2 |
| 3 | C00001 | DENOMINATION 3 | DISPENSED |
| 4 | C00002 | DENOMINATION 3 | DISPENSED |
| 5 | A10003 | MIXED | DENOMINATION 1 |

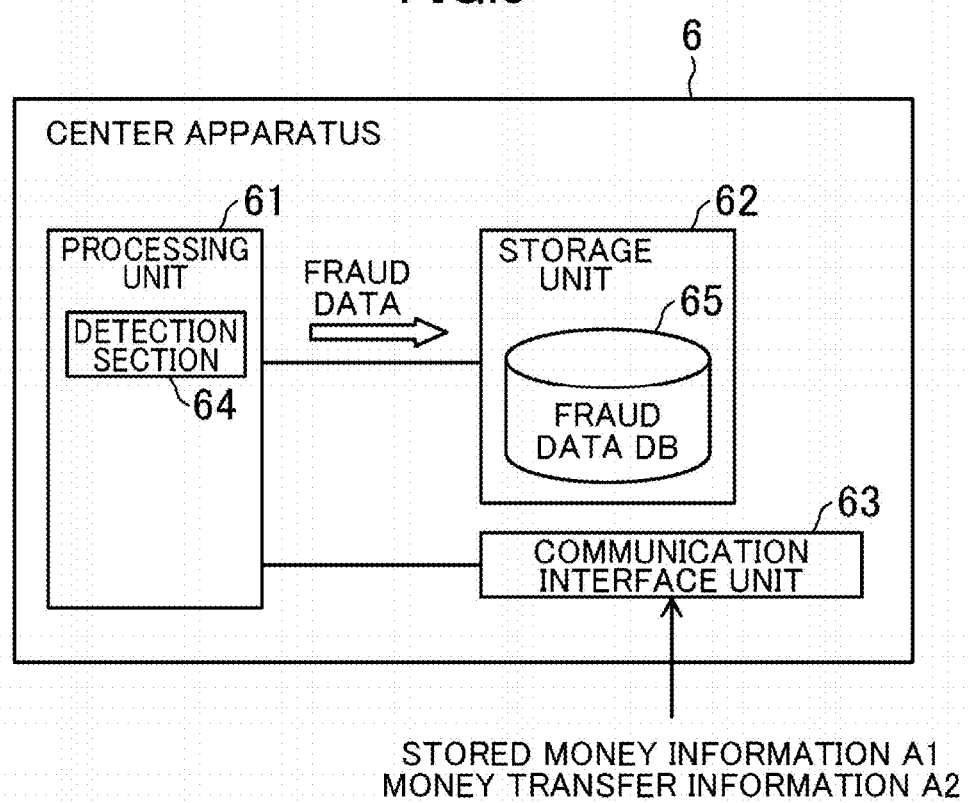

FIG. 7A STORED MONEY INFORMATION

| MIXED STORAGE | |
|---|---|
| 5 | C10005 |
| 4 | D00004 |
| 3 | A10003 |
| 2 | B10002 |
| 1 | A10001 |

FIG. 7B MONEY TRANSFER INFORMATION

| 1 | C10005 | MIXED→DENOMINATION 3 |
|---|---|---|
| 2 | D00004 | MIXED→DISPENSED |
| 3 | B10003 | MIXED→DENOMINATION 2 |

BANKNOTE THAT SHOULD NOT EXIST EXITS
(B10003 WAS NOT STORED IN MIXED STORAGE)

FIG. 7C MONEY TRANSFER INFORMATION

| 1 | C10005 | MIXED→DENOMINATION 3 |
|---|---|---|
| 2 | D00004 | MIXED→DISPENSED |
| 3 | B10002 | MIXED→DENOMINATION 2 |

BANKNOTE THAT SHOULD EXIST DOES NOT EXIT
(A10003 SHOULD HAVE BEEN IN MIXED STORAGE)

FIG. 7D MONEY TRANSFER INFORMATION

| 1 | C10005 | MIXED→DENOMINATION 3 |
|---|---|---|
| 2 | A10003 | MIXED→DENOMINATION 1 |
| 3 | D00004 | MIXED→DISPENSED |

TRANSFER ORDER WAS CHANGED
(ORDER OF D00004 AND A10003 WAS REVERSED)

FIG.8

FRAUD DATA DB

| DETECTION DATE AND TIME | BRANCH | MACHINE NUMBER | STORAGE | ABNORMALITY CONTENTS |
|---|---|---|---|---|
| 2017/10/15 15:32 | BRANCH A | No. 3 | MIXED | CHECK 1 |
| 2017/10/21 10:15 | BRANCH B | No. 2 | DENOMINATION 1 | CHECK 2 |
| 2017/11/ 2 13:56 | BRANCH C | No. 4 | DENOMINATION 2 | CHECK 3 |
| ⋮ | ⋮ | ⋮ | ⋮ | ⋮ | ardi
MONEY HANDLING SYSTEM, MONEY HANDLING APPARATUS, CENTER APPARATUS, AND FRAUD DETECTING METHOD FOR MONEY HANDLING APPARATUS

CROSS-REFERENCE TO RELATED APPLICATIONS

This is a continuation of International Application No. PCT/JP2018/040876 filed on Nov. 2, 2018, which claims priority to Japanese Patent Application No. 2017-222510 filed on Nov. 20, 2017. The entire disclosures of these applications are incorporated by reference herein.

BACKGROUND

The present disclosure relates to technologies for checking an occurrence of a fraud in a money handling apparatus.

Japanese Patent No. 5606711 describes a technology for checking presence or absence of an abnormality in a banknote depositing and dispensing machine during a detailed inspection by circulating banknotes stored in a storage via another empty storage or a money depositing and dispensing section to check an inventory amount and comparing a result of inventory amount check with stored inventory amount data.

In a configuration according to Japanese Patent No. 5606711, in a period from an end of a detailed inspection and a start of a next detailed inspection, even when someone takes out one or more banknotes from the apparatus, it is not found that the one or more banknotes have been taken out. Therefore, even in a case where someone extracts one or more banknotes from the apparatus and uses them privately, if the someone returns one or more banknotes of the same amount as the amount of the extracted banknotes to the apparatus before a next detailed inspection, this fraud is not discovered. The fraud would be of course discovered if the someone could not return one or more banknotes. However, the fraud might be discovered after days have been passed, and therefore, it tends to be difficult to find detailed circumstances of the fraud or the amount of damage may be large in some cases.

Also, in the configuration of Japanese Patent No. 5606711, when a controller who checks results of detailed inspections takes part in a fraud, the fraud would not be discovered.

In view of the foregoing, a technology disclosed herein has been devised, and therefore, it is an object of the present disclosure to enable more strict monitoring of an occurrence of a fraud for money handling apparatuses.

SUMMARY

A technology disclosed herein is directed to a money handling system comprising: a money handling apparatus includes at least one storage that stores money, and circuitry configured to control money handling; acquire, when predetermined money handling is executed, stored money information including specific information of the money stored in the storage before execution of the predetermined money handling and money transfer information including specific information of money transferred in execution of the predetermined money handling; determine, based on the stored money information and the money transfer information, a presence or absence of an occurrence of an abnormality related to money in the money handling apparatus; and generate, in a case that it is determined that there is the presence of the occurrence of the abnormality, fraud data related to the occurrence of the abnormality.

BRIEF DESCRIPTION OF THE DRAWINGS

FIG. 3 is a table illustrating an example of stored money information.
FIG. 4 is a table illustrating an example of money transfer information.
FIG. 5 is a functional block diagram of a center apparatus.
FIGS. 7A to 7D are tables illustrating an operation example of the detection section.
FIG. 8 is a table illustrating an example of a fraud data database DB.

DETAILED DESCRIPTION

Figure 1:
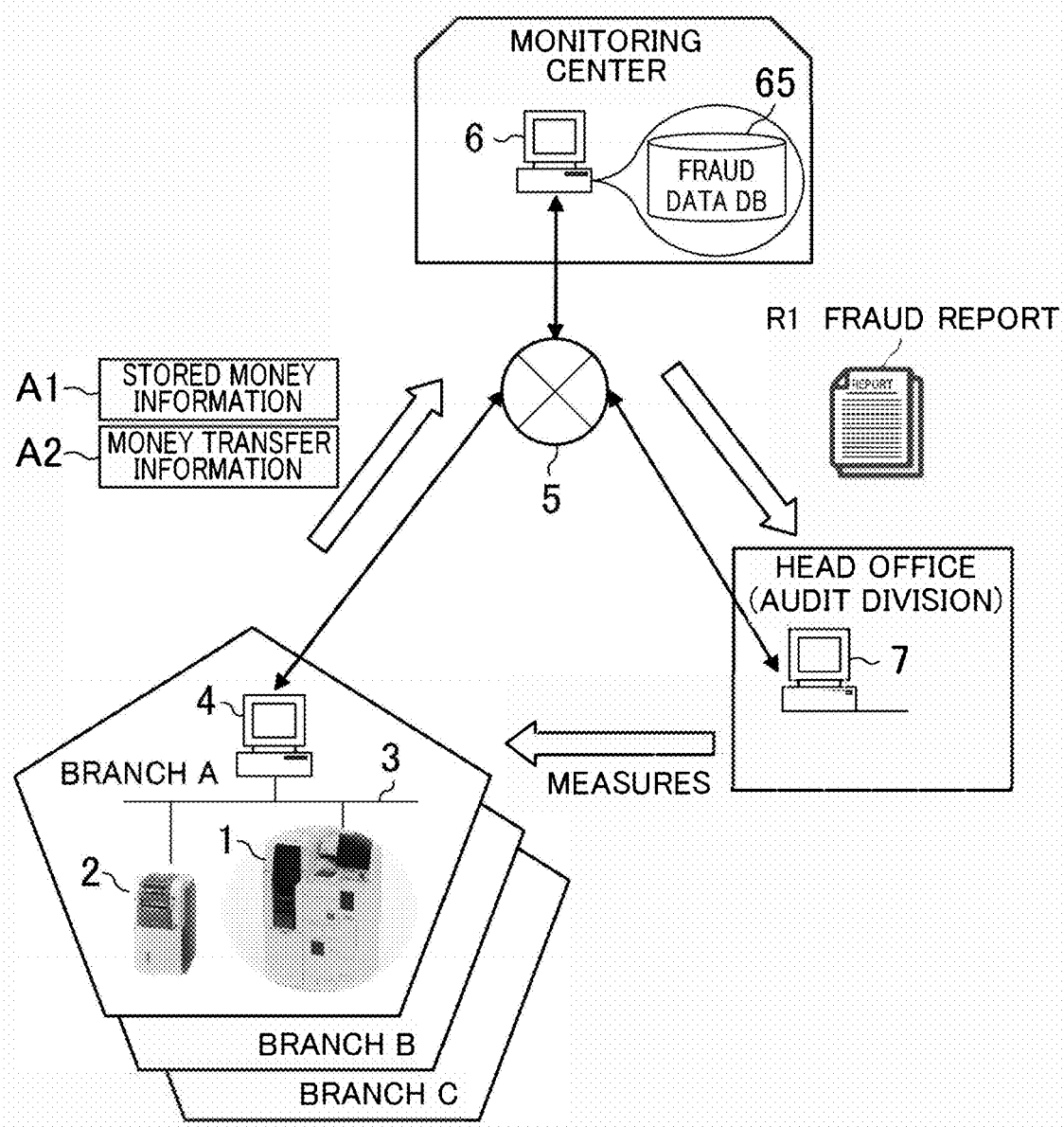
FIG. 1 is an image view illustrating an entire configuration of a money handling system.

Embodiments will be described in detail below with reference to the accompanying drawings.
(Entire Configuration of Money Handling System)
FIG. 1 is an image view illustrating an entire configuration of a money handling system. In the money handling system of FIG. 1, for example, for a money handling apparatus installed in each branch of a financial institution, for example, an audit division of a head office can monitor an occurrence of a fraud related to money.

In the configuration of FIG. 1, money handling apparatuses 1 and 2 that are banknote depositing and dispensing machines or the like are installed in a branch A, and the money handling apparatuses 1 and 2 are coupled to a management apparatus 4 that is, for example, a control computer in the branch via a branch network 3. Similarly, one or more money handling apparatuses and a control apparatus are installed in each of other branches, that is, for example, a branch B, a branch C, or the like. The respective control apparatuses of the branches including the management apparatus 4 of the branch A are coupled to a center apparatus 6 that is a computer located in a monitoring center via a network 5. Also, the center apparatus 6 is coupled to an audit computer 7 located in an audit division of a head office via the network 5.

Each of the money handling apparatuses of the branches including the money handling apparatuses 1 and 2 of the branch A acquires stored money information A1 and money transfer information A2 as executing predetermined money handling. The predetermined money handling is, for example, money dispensing or detailed inspection. The predetermined money handling may be money depositing, money replenish, or money collection. The stored money information A1 is information related to money that has been stored in a storage provided in the money handling apparatus before execution of the predetermined money handling. The money transfer information A2 is information related to money transferred in execution of the predetermined money handling. For money in the form of banknote, the stored money information A1 includes serial number data of one or more banknotes that have been stored in the storage, and the money transfer information A2 includes serial number data of one or more banknotes that have been transferred. The serial number data of one or more banknotes is an example of specific information for money. Furthermore, when a plurality of banknotes are stored in the storage, the stored money information A1 may include information indicating a storage order of the banknotes. When a plurality of banknotes are transferred by execution of the predetermined money handling, the money transfer information A2 may include information indicating a transfer order of the banknotes. Each of the money handling apparatuses of the branches transmits the stored money information A1 and the money transfer information A2 that have been acquired to the center apparatus 6 via the network 5. This transmission is performed via the control apparatus of the corresponding branch.

The center apparatus 6 receives the stored money information A1 and the money transfer information A2 transmitted from each of the money handling apparatuses of the branches. The center apparatus 6 detects, based on the stored money information A1 and the money transfer information A2 that have been received, an occurrence of an abnormality related to money in the money handling apparatus of a transmission source. For money in the form of banknote, the center apparatus 6 checks the serial number data included in the stored money information A1 and the serial number data included in the money transfer information A2 and, when a checking result corresponds to a predetermined check condition, the center apparatus 6 determines that an abnormality occurred. In determining whether an abnormality occurred, the information indicating the storage order included in the stored money information A1 and the information indicating the transfer order included in the money transfer information A2 may be added for checking. The checking result may be a result of determination on whether there is corresponding serial number data in the stored money information A1 and the money transfer information A2. The checking result may be a result of determination based on an order of serial number data in the stored money information A1 and the money transfer information A2. When the occurrence of an abnormality is detected, fraud data related to the occurrence of the abnormality is generated and is stored in a fraud data database (DB) 65. A database is a collection of information organized such that search or accumulation can be easily performed, and is realized by a computer.

A person in charge who is in the monitoring center refers to the fraud data DB 65 and makes a fraud report R1 in which contents of the occurrences of frauds are compiled. The person in charge transmits the fraud report R1 to the audit computer 7 in the head office. An auditor in the head office checks the contents of the fraud report R1 and takes measures for increasing an audit level for each branch.

Figure 2:
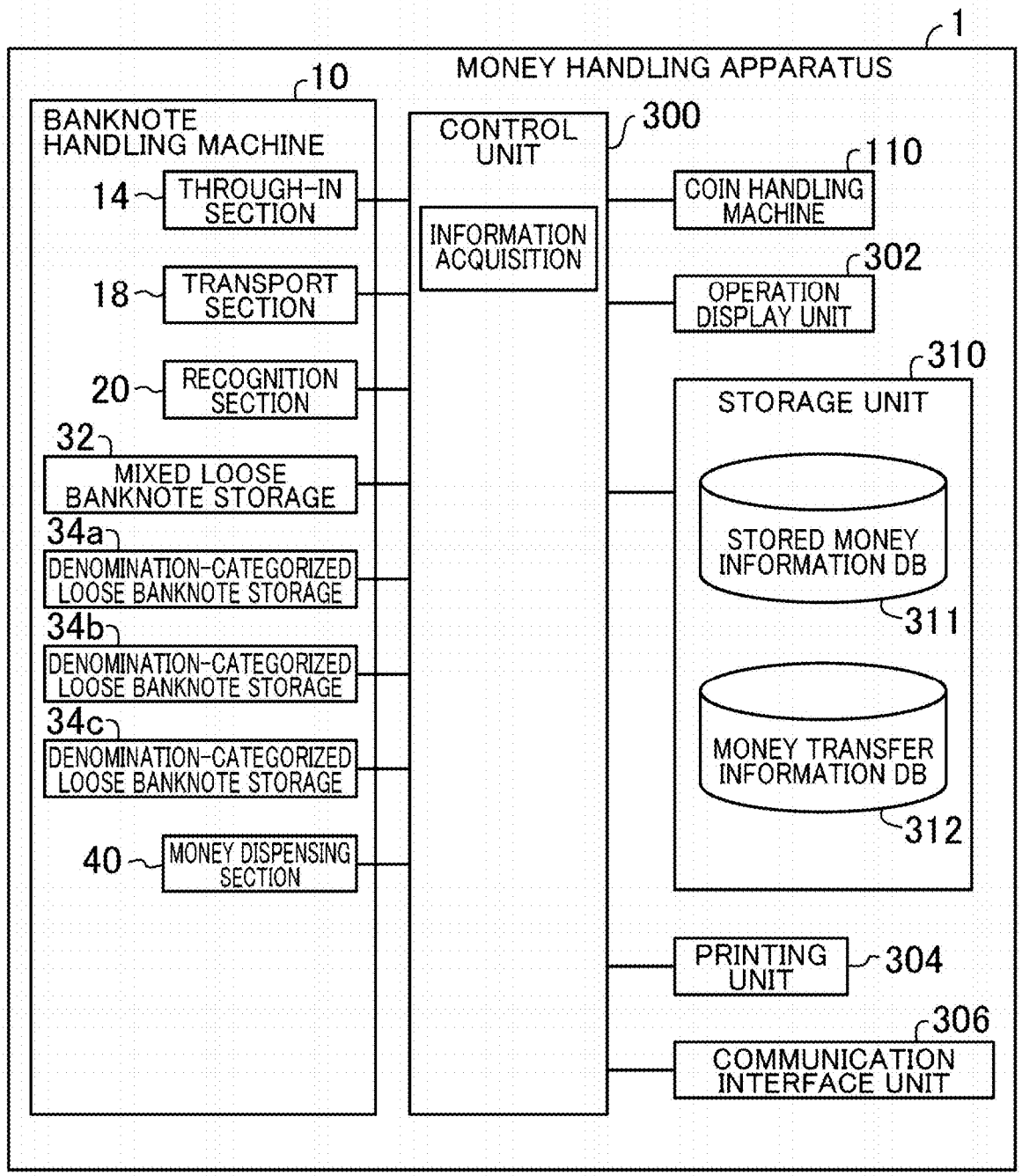
FIG. 2 is a functional block diagram of a money handling apparatus.

FIG. 2 is a block diagram illustrating an outline of a functional configuration of the money handling apparatus 1. Herein, the money handling apparatus 1 includes a banknote handling machine 10 and a coin handling machine 110. Note that, in FIG. 2, the functional configuration is simply illustrated, omitting components irrelevant to this embodiment. As illustrated in FIG. 2, a control unit 300 that performs control of each component is provided in the money handling apparatus 1. The control unit 300 includes, for example, a processor that executes a program as a main hardware configuration. The processor executes the program, thereby realizing a function. The processor includes one or more electronic circuits, such as, for example, an integrated circuit (IC), a large-scale integration (LSI), or the like. The program may be recorded in a processor-readable recording medium, such as, for example, a read only memory (ROM), a hard disk, or the like. Each of the components of the banknote handling machine 10, that is, specifically, a throw-in section 14, a transport section 18, a recognition section 20, a mixed loose banknote storage 32, denomination-categorized loose banknote storages 34a to 34c, a money dispensing section 40, or the like, is coupled to the control unit 300. The control unit 300 receives information for a recognition result of loose banknote performed by the recognition section 2 or the like, sends a command signal to each component of the banknote handling machine 10, and thereby, controls an operation of the corresponding component. Herein, the recognition section 20 is configured to be able to read the serial number of a banknote that is transported by the transport section 18, in addition to the denomination and fitness of the banknote. The mixed loose banknote storage 32 and the denomination-categorized loose banknote storages 34a to 34c are examples of the storage of the money handling apparatus 1. The storage has a storage area in which a plurality of banknotes can be piled in a stack and thus stored on a moving stage. The storage may have a storage area in which banknotes are wound around a drum with a tape and thus stored. The storage has a take-in mechanism that takes in banknotes one by one in the storage area and a take-out mechanism that takes out banknotes one by one from the storage area.

Each component of the coin handling machine 110 is coupled to the control unit 300 and the control unit 300 controls an operation of the coin handling machine 110. Furthermore, each of an operation display unit 302, a printing unit 304, a storage unit 310, and a communication interface unit 306 is coupled to the control unit 300. The storage unit 310 stores information, such as a processing history in the money handling apparatus 1, inventory amounts of banknotes and coins stored in the money handling apparatus 1, or the like. The control unit 300 can transmit and receive various signals to and from an external device, such as the management apparatus 4 or the like via the communication interface unit 306.

In this embodiment, the storage unit 310 includes a stored money information DB 311 and a money transfer information DB 312. The stored money information DB 311 stores information (stored money information) related to money stored in the storage of the money handling apparatus 1. The stored money information herein is information related to banknotes stored in the mixed loose banknote storage 32 and the denomination-categorized loose banknote storages 34a to 34c and includes serial number data in the storage order. The money transfer information DB 312 stores information (money transfer information) related to money transferred in execution of the predetermined money handling. The money transfer information herein includes serial number data in a transfer order for banknotes that have been transferred. When the predetermined money handling, such as money dispensing, detailed inspection, or the like, is executed, the control unit 300 causes the stored money information before execution of the predetermined money handling to be stored in the stored money information DB 311 and the money transfer information related to the predetermined money handling to be stored in the money transfer information DB 312.

FIG. 3 illustrates an example of the stored money information. The example of FIG. 3 includes information of the denominations, the number of banknotes, and the amount of money for stored money in the denomination-categorized loose banknote storages 34a to 34c (represented as DENOMINATION-CATEGORIZED STORAGES 1 to 3 in FIG. 3) and the mixed loose banknote storage 32 (represented as MIXED STORAGE in FIG. 3). In addition, as a serial number list, the serial number data for stored banknotes is stored in the storage order. Items of the stored money information are not limited to those illustrated in FIG. 3, and may include at least the serial number data of the stored banknotes. Even when the stored money information includes information indicating the storage order of the stored banknotes, the stored money information may further include information that associates the serial number data of the stored banknotes with the storage order, and the storage order and a list order are not needed to be associated with each other.

FIG. 4 is an example of the money transfer information. In the example of FIG. 4, for banknotes transferred in execution of the predetermined money handling, serial number data and data of storages as a transfer source and a transfer destination are stored as a serial number list in an order in which the data is transferred. For example, for data in a first row, it is indicated that a banknote with serial number data "A10001" was transferred from the mixed loose banknote storage 32 to the denomination-categorized loose banknote storage 34a. Items of the money transfer information are not limited to those illustrated in FIG. 4 and may include at least serial number data of transferred banknotes. When the money transfer information includes information indicating an order in which banknotes were transferred, the money transfer information may further include information that associates the serial number data of the banknotes with the transfer order, and the transfer order and a list order are not needed to be associated with each other.

FIG. 5 is a block diagram illustrating an outline of a functional configuration of the center apparatus 6. Note that, in FIG. 5, the functional configuration is simply illustrated, omitting components irrelevant to this embodiment. As illustrated in FIG. 5, the center apparatus 6 includes a processing unit 61 formed of a processor that executes, for example, a software, a storage unit 62, and a communication interface unit 63 used for transmitting and receiving data to and from an external device. The communication interface unit 63 receives the stored money information A1 and the money transfer information A2 transmitted from the money handling apparatus of each branch, that is, the money handling apparatus 1 of the branch A or the like. The processing unit 61 includes a detection section 64. For example, the processor of the processing unit 61 executes a program and thereby causes the detection section 64 to realize a function. The processor includes one or more electronic circuits, such as, for example, an integrated circuit (IC), a large-scale integration (LSI), or the like. The program may be recorded in a processor-readable recording medium, such as, for example, a read only memory (ROM), a hard disk, or the like. The detection section 64 determines the presence or absence of the occurrence of an abnormality related to money in the money handling apparatus of the transfer source, based on the stored money information A1 and the money transfer information A2 received by the communication interface unit 63. When the detection section 64 detects the occurrence of an abnormality related to the money, the detection section 64 generates fraud data related to the occurrence of the abnormality. The storage unit 62 includes the fraud data DB 65 and the fraud data generated by the detection section 64 is stored in the fraud data DB 65. Note that the fraud data preferably includes at least data that specifies the money handling apparatus in which the abnormality occurred and the storage related to the abnormality. Thus, the money handling apparatus and the storage in which the abnormality occurred can be easily specified from the fraud data.

Figure 6:
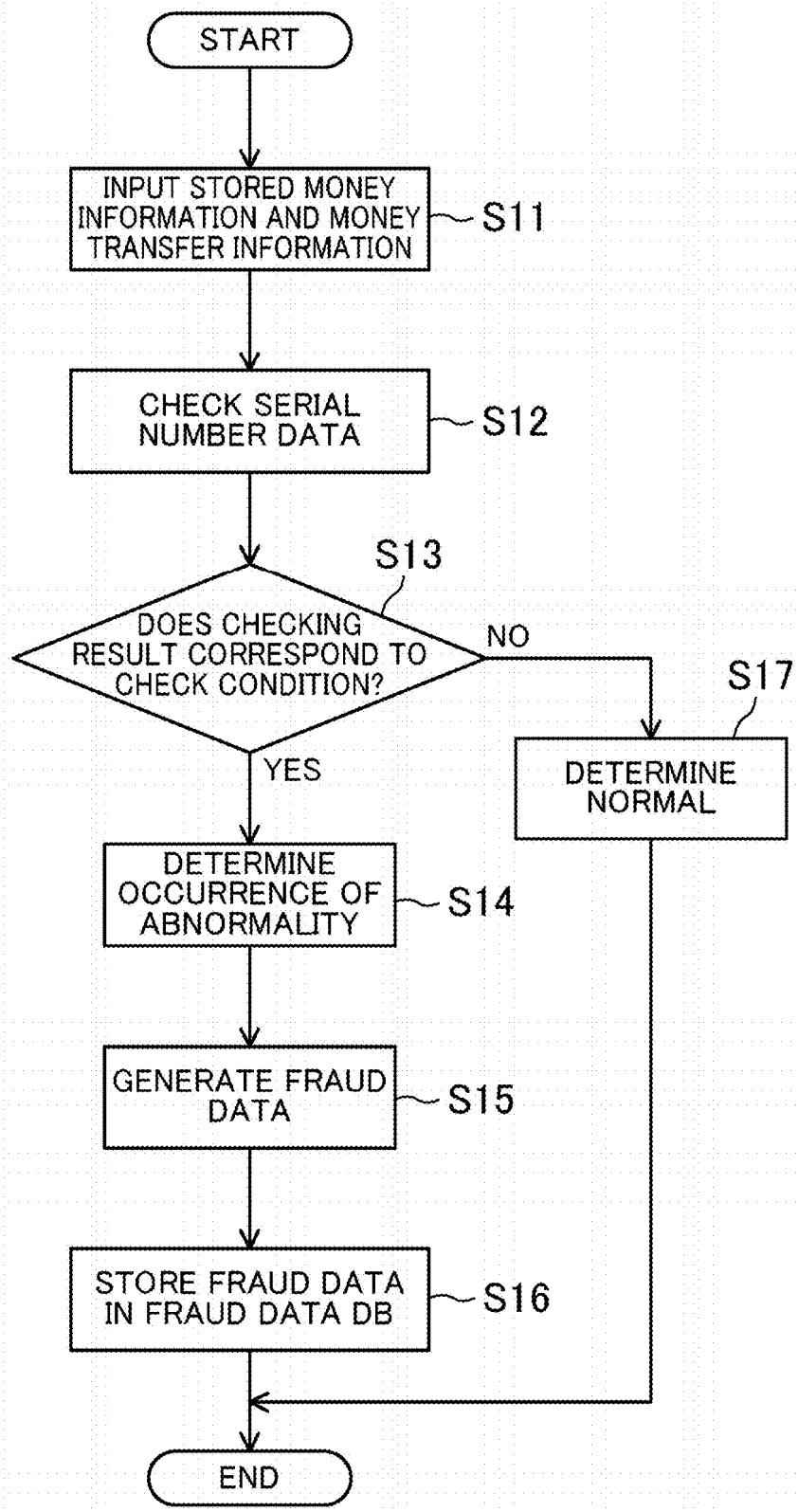
FIG. 6 is a flowchart illustrating an operation example of a detection section.

FIG. 6 is a flowchart illustrating an operation example of the detection section 64. As illustrated in FIG. 6, when the communication interface unit 63 receives the stored money information A1 and the money transfer information A2, the detection section 64 inputs the stored money information A1 and the money transfer information A2 that have been received (S11). The detection section 64 checks the serial number data included in the stored money information A1 and the serial number data included in money transfer information A2 (S12). Whether a checking result corresponds to a predetermined check condition is determined (S13) and, when the checking result corresponds to the predetermined check condition (YES in S13), it is determined that an abnormality related to money has occurred in the money handling apparatus (S14). On the other hand, when the checking result does not correspond to the predetermined check condition (NO in S13), it is determined that the money handling apparatus normally operates and the process ends (S17).

FIGS. 7A to 7D are tables illustrating an example of the check condition. Now it is assumed that the stored money information includes data of FIG. 7A as the serial number data of banknotes stored in the mixed loose banknote storage 32 (represented as MIXED STORAGE in FIG. 7A). Herein, the mixed loose banknote storage 32 has a last-in first-out (LIFO) configuration, that is, a configuration in which a banknote stored last is delivered first.

In this case, the money transfer information includes data of FIG. 7B. This data indicates that banknotes with serial numbers "C10005" and "D00004" were normally transferred, but a banknote with a serial number "B10003" was transferred although the banknote with the serial number "B10003" was not stored in the mixed loose banknote storage 32. That is, this data indicates that the banknote that should not exist exists (appeared), and it is determined that an abnormality occurred (there is a probability that a banknote was mixed in or replaced). As another option, assume that the money transfer information includes data of FIG. 7C. In this case, the banknotes with the serial number "C10005" and "D00004" were normally transferred, but a banknote with a serial number "B10002" was transferred although a banknote with a serial number "A10003" should have been transferred from the mixed loose banknote storage 32 before the banknote with the serial number "B10002". That is, the banknote that should exist does not exist and it is determined that an abnormality occurred (there is a probability that the banknote was extracted). As still another option, the money transfer information includes data of FIG. 7D. In this case, the banknote with the serial number "C10005" was normally transferred but an order of the banknote with the serial number "A10003" and the banknote with the serial number "D00004" was reversed. That is, the transfer order was changed and it is determined that an abnormality occurred. Using the above described check conditions, the presence or absence of an abnormality is determined.

Returning to FIG. 6, when the detection section 64 determines that an abnormality related to money occurred (S14), the detection section 64 generates fraud data that is data related to this abnormality (S15). Then, the generated fraud data is stored in the fraud data DB 65 (S16).

FIG. 8 illustrates an example of fraud data stored in the fraud data database DB 65. In the example of FIG. 8, the fraud data includes a detection date and time on which the occurrence of an abnormality was detected, a branch in which the abnormality occurred, a machine number of a money handling apparatus in which the abnormality occurred, a storage in which the abnormality occurred, and contents of the abnormality. As the contents of the abnormality, herein, corresponding check conditions are specified. Note that items of the fraud data are not limited to those indicated herein and may include information, such as, for example, an operator ID or the like, that specifies an operator who operated the money handling.

The person in charge who is in the monitoring center refers to the fraud data DB 65, makes the fraud report R1 in which the contents of the occurrences of frauds are compiled, and transmits the fraud report R1 to the audit computer 7 in the head office. The auditor in the head office checks the contents of the fraud report R1 and takes measures for increasing an audit level for each branch or the like.

As described above, according to this embodiment, in the money handling apparatus 1 or the like, when the predetermined money handling is executed, the stored money information A1 including the serial number data of money stored in the storage before execution of the predetermined money handling and the money transfer information A2 including the serial number data of money transferred in execution of the predetermined money handling are acquired. Then, the presence or absence of the occurrence of an abnormality related to the money in the money handling apparatus 1 or the like is determined based on the stored money information A1 and the money transfer information A2 and, when the occurrence of an abnormality is detected, fraud data related to the occurrence of the abnormality is generated. Thus, the occurrence of an abnormality in the money handling apparatus 1 or the like installed, for example, in each branch of a financial institution can be checked by referring to the fraud data. Accordingly, for example, an operation, such as transmission of a fraud report that reports the occurrence of an abnormality to an audit division of a head office of the financial institute, or the like, can be executed based on the fraud data. Therefore, for the money handling apparatus 1 or the like, more strict monitoring of the occurrence of a fraud is enabled.

In this embodiment, the detection section 64 is provided in the center apparatus 6 and detection of the occurrence of an abnormality related to money in the money handling apparatus 1 or the like is performed in a center apparatus 6 side. Therefore, it is not needed to provide a detection section in the money handling apparatus 1 or the like installed in each branch. Also, as the detection section 64 is provided in the center apparatus 6, update of a determination criteria for the presence or absence of the occurrence of an abnormality, such as the above described check condition or the like, is facilitated.

Moreover, in this embodiment, the money handling apparatus 1 or the like preferably transmits the stored money information A1 and the money transfer information A2 via one communication immediately after execution of the predetermined money handling. Thus, it is enabled to detect the occurrence of an abnormality related to money in the money handling apparatus at earlier timing in a center apparatus side.

<Other Configurations>
(First One of Other Configurations)

In the above described embodiment, the center apparatus 6 includes the detection section 64 that detects the occurrence of an abnormality related to money in the money handling apparatus, based on the stored money information and the money transfer information. However, the detection section may be provided in the money handling apparatus.

Figure 9:
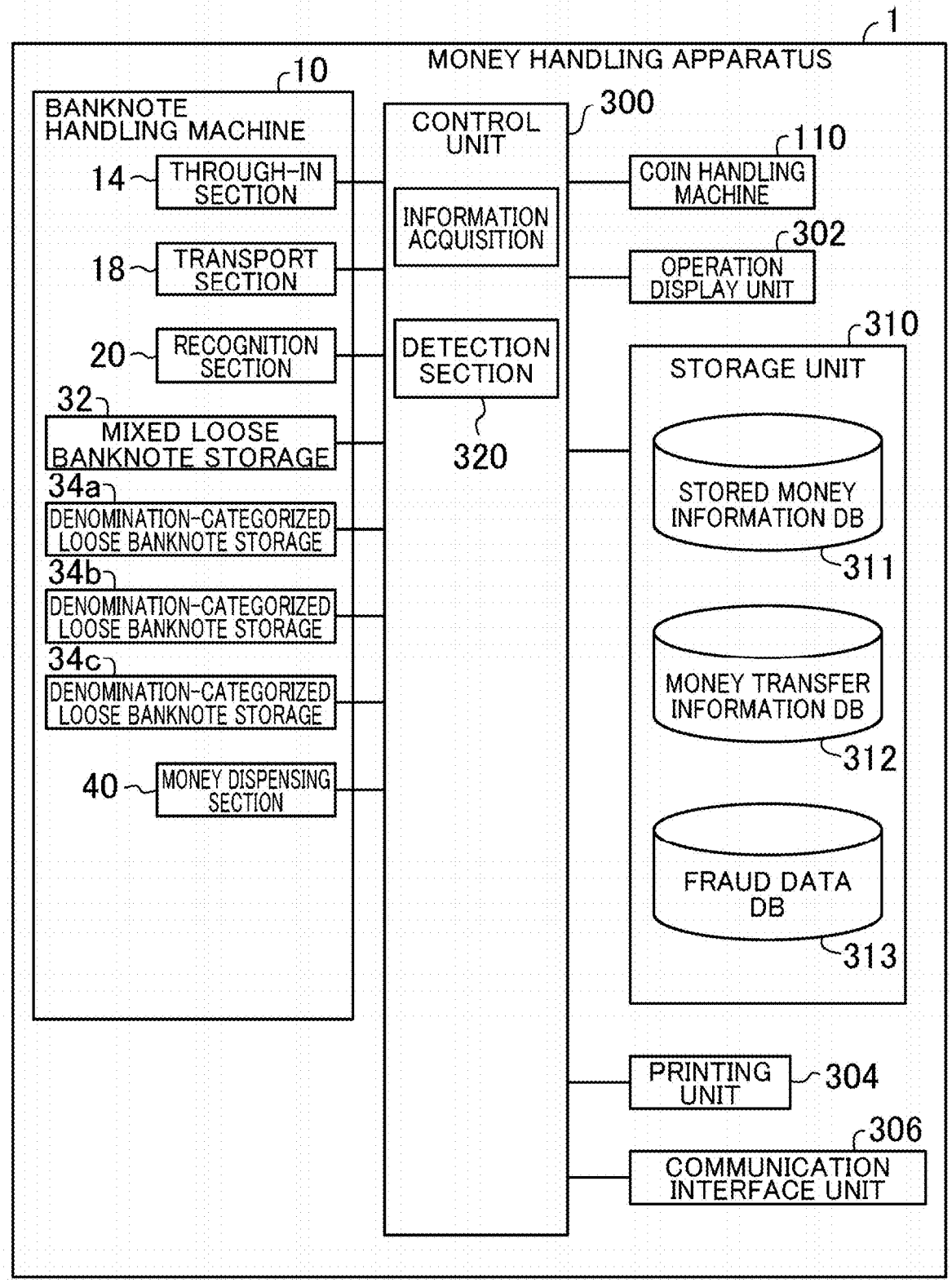
FIG. 9 is a functional block diagram of a money handling apparatus including the detection section.

FIG. 9 is a block diagram illustrating an outline of another functional configuration of the money handling apparatus 1. The configuration of FIG. 9 is substantially similar to that of FIG. 2. However, the storage unit 310 includes a fraud data DB 313, in addition to the stored money information DB 311 and the money transfer information DB 312. The control unit 300 includes a detection section 320. The detection section 320 performs a similar operation to that of the detection section 64 of the center apparatus 6 of the above described embodiment. That is, the detection section 320 reads the stored money information before execution of the predetermined money handling from the stored money information DB 311 and also reads the money transfer information in the predetermined money handling from the money transfer information DB 312. The detection section 320 checks the serial number data in the storage order included in the stored money information and the serial number data in the transfer order included in the money transfer information and determines whether a checking result corresponds to a predetermined check condition. When the checking result corresponds to the predetermined check condition, the detection section 320 determines that an abnormality related to money occurred, generates fraud data, and stores the generated fraud data in the fraud data DB 313. Thereafter, the control unit 300 transmits the fraud data stored in the fraud data DB 313 to the center apparatus 6 via the communication interface unit 306.

In this configuration, the center apparatus 6 does not need to include the detection section 64. The center apparatus 6 receives the fraud data transmitted from the money handling apparatus 1 via the communication interface unit 63 and stores the received fraud data in the fraud data DB 65

In this configuration, the data transmitted from the money handling apparatus 1 to the center apparatus 6 is only the fraud data transmitted when the occurrence of an abnormality related to money is detected, and therefore, the transmission data amount is markedly reduced, and the transmission frequency is largely reduced. Moreover, in this configuration, the money handling apparatus 1 may be configured such that, when the detection section 320 of the money handling apparatus 1 detects the occurrence of an abnormality, an alert is output from the money handling apparatus 1, for example, via the operation display unit 302.

(Second One of Other Configurations)

The detection section that detects the occurrence of an abnormality related to money in the money handling apparatus 1, based on the stored money information and the money transfer information, may be provided in the management apparatus 4 located in the same branch in which the money handling apparatus 1 is located.

Figure 10:
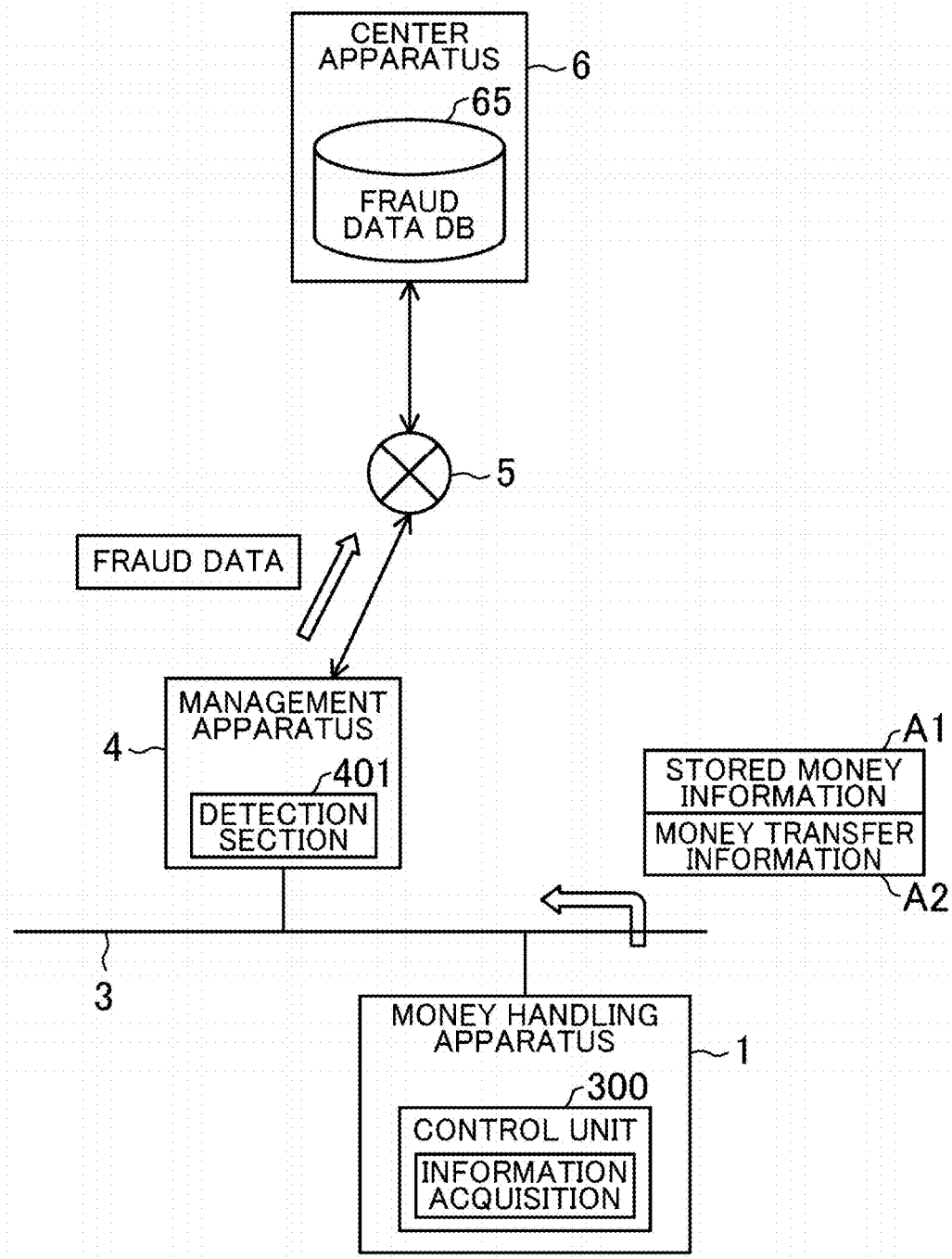
FIG. 10 is a functional block diagram illustrating another example of the configuration of the money handling system.

FIG. 10 is an image view illustrating another configuration of the money handling system in the present disclosure. In the configuration of FIG. 10, the control apparatus 4 includes a detection section 401 that performs a similar operation to that of the detection section 64 in the center apparatus 6 of the above described embodiment. In this configuration, similar to the above described embodiment, the money handling apparatus 1 transmits the stored money information A1 and the money transfer information A2 to outside. The management apparatus 4 receives the stored money information A1 and the money transfer information A2. The detection section 401 in the management apparatus 4 checks the serial number data in the storage order included in the stored money information A1 and the serial number data in the transfer order included in the money transfer information A2 and determines whether a checking result corresponds to the predetermined check condition. When the checking result corresponds to the check condition, the detection section 401 determines that an abnormality related to money occurred, generates fraud data, and transmits the generated fraud date to the center apparatus 6. The center apparatus 6 receives the fraud data transmitted from the management apparatus 4, and stores the received fraud data in the fraud data DB 65.

In this configuration, the stored money information A1 and the money transfer information A2 are only transmitted from the money handling apparatus 1 to the management apparatus 4. The data transmitted from the management apparatus 4 to the center apparatus 6 is only fraud data transmitted when the occurrence of an abnormality related to money is detected. Therefore, the transmission data amount is markedly reduced, and the transmission frequency is largely reduced. Moreover, in this configuration, the management apparatus 4 may be configured to, when the detection section 401 of the management apparatus 4 detects the occurrence of an abnormality, output an alert.

First Modified Example

In the above described embodiment, the presence or absence of the occurrence of an abnormality is determined by checking the serial number data of the stored money information and the serial number data of the money transfer information. In addition to this, the presence or absence of the occurrence of an abnormality may be determined using banknote orientation data as well as the serial number data. Specifically, there are four patterns of a banknote orientation depending on combinations of up and down, and front and back. The money handling apparatus 1 is configured such that, when the banknote orientation can be recognized by the recognition section 20, each of the stored money information and the money transfer information includes the banknote orientation data. The detection section may be configured to perform banknote orientation data checking, in addition to serial number data checking.

In the above described embodiment, the serial number data of a banknote is checked. However, the serial number data of a banknote is an example of the specific information of money, and some other specific information of the banknote may be used.

In the above described embodiment, data exchange between the apparatuses is performed via a network. However, the data exchange is not limited thereto, but may be performed, for example, via a storage medium. In this case, processing is enabled even in a situation where a communication environment is not established or when a network failure occurs.

First Example

In a first example, a method for checking an abnormality in a cash post will be described. The cash post is an apparatus that receives an unfit note that cannot be recognized, a slip of a check, or the like. The cash post does not include a function that recognizes a medium, and an operator manually inputs a denomination of a loaded medium or the amount of money to the cash post via an operation terminal. In this example, when money is deposited in the banknote depositing and dispensing machine, not only a serial number of a normal banknote but also a serial number of a rejected note are recorded. Banknotes in the cash post can be managed as well by loading the rejected note to the cash post. Thus, a fraud related to the cash post can be reduced.

Figure 11A:
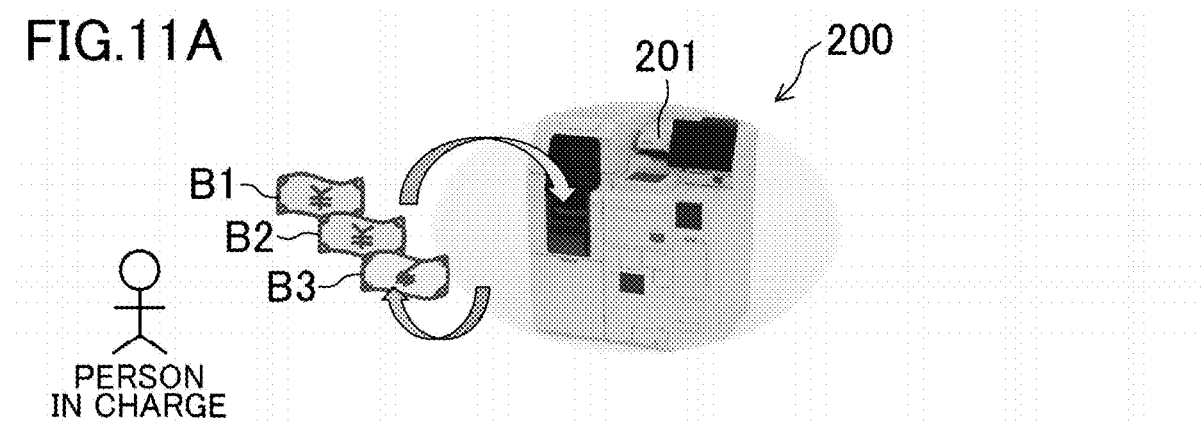
FIGS. 11A to 11C are views illustrating an operation of another example.
Figure 11B:
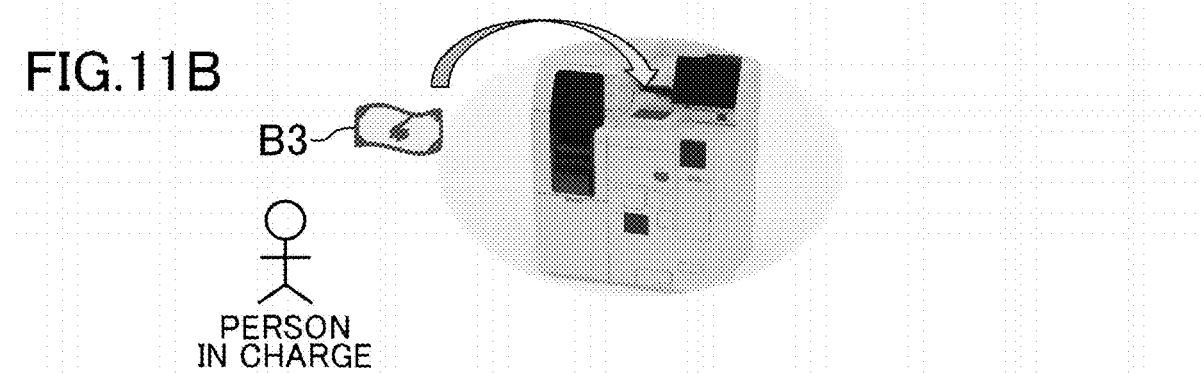
Figure 11C:
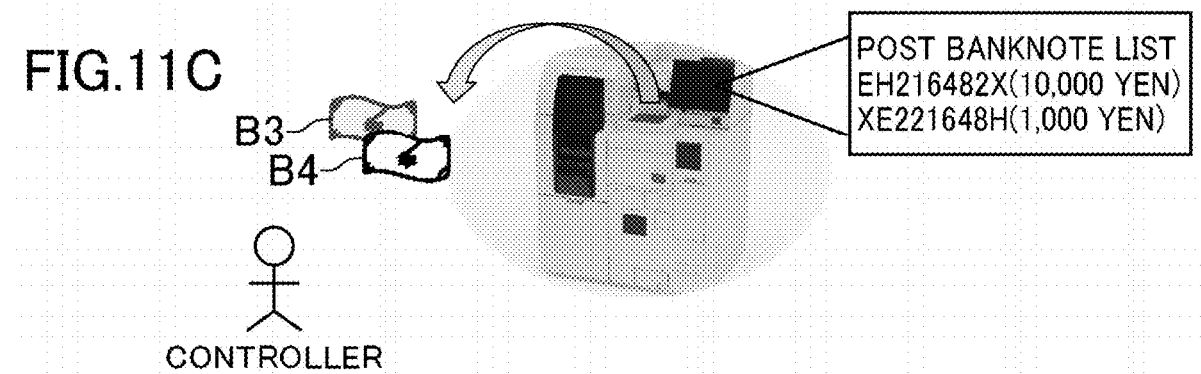

FIGS. 11A to 11C are views illustrating this example. In FIGS. 11A to 11C, a cash post 201 is provided in a money handling apparatus 200. First, assume that, as illustrated in FIG. 11A, a person in charge deposits banknotes B1 to B3 to the money handling apparatus 200 and the banknote B3 is rejected. At this time, the money handling apparatus 200 records serial numbers of the banknotes B1 and B2 that have been received as well as a serial number of the banknote B3 that has been rejected. Next, as illustrated in FIG. 11B, the person in charge loads the banknote B3 rejected by the money handling apparatus 200 to the cash post 201. At this time, an operator manually inputs information of the loaded rejected banknote B3 via an operation terminal of the cash post 201, based on the information of the rejected banknote B3 recorded through money depositing. This information includes the denomination and the serial number of the banknote.

Thereafter, as illustrated in FIG. 11C, a controller collects all of the banknotes B3 and B4 stored in the cash post 201, for example, once a month. Then, the information of the banknotes stored in the cash post 201 is output, for example, to a display device and the controller visually compares the output information to the actual banknotes B3 and B4. In this case, when the number of banknotes by each banknote denomination does not match, NG (not good) is of course determined. Even in a case where the number of banknotes by each banknote denomination matches, when the serial number does not match, NG is determined. For example, assume that, in the information output to the display device, although the number of ten-thousand yen banknotes is one and the number of thousand yen banknotes is one, and thus, the number of banknotes by each banknote denomination matches that of each of the banknotes B3 and B4, the serial number of the actual banknote B3 is "HX482216E" while the serial number of the ten-thousand yen banknote is "EH216482X". In this case, NG is determined. Thus, a probability that a fraud, such as extraction of a banknote from the cash post 201, or the like, was performed can be recognized by performing the above described determination.

Note that the money handling apparatus 200 may be configured such that, for the rejected note, when only a part of the serial number can be read, the part is recorded. Even a part of the serial number is useful for visual determination. When the serial number cannot be read at all, it may be determined that the rejected note is not a subject to be monitored.

What is claimed is:

1. A banknote handling system for monitoring of each banknote handling operation to enable detection of fraud and abnormalities, the banknote handling system comprising:
 a banknote handling apparatus configured to perform a predetermined set of banknote handling transfer operations including dispensing, depositing, replenishing, collection, and inspection, the banknote handling apparatus comprising:
  a plurality of storage containers that store banknotes, wherein each of the storage containers has a storage area, the plurality of storage containers including a mixed loose banknote storage container and at least one denomination-categorized loose banknote storage container, and the banknotes are stored or dispensed in a last in first out (LIFO) order;

a take-in mechanism that takes in the banknotes one by one for storage in the storage area; and
a take-out mechanism that takes out the banknotes one by one from the storage area;
first circuitry configured to
control banknote handling by the banknote handling apparatus; and
acquire stored banknote information and banknote transfer information, wherein
the stored banknote information comprises, for each of the storage containers, a denomination of each banknote, a number of banknotes in the storage container, an amount of money in the storage container, and a serial number of each banknote in a storage order in which the banknote is stored in the storage container, and
the banknote transfer information comprises, for each banknote transferred in executing a banknote handling transfer operation, a transfer source, a transfer destination, and the serial number of the banknote in a transfer order in which the banknote was transferred in execution of the banknote handling transfer operation; and
second circuitry comprising a monitoring unit in electronic communication with the banknote handling apparatus, the second circuitry configured to
acquire, after each banknote handling transfer operation has been executed, the stored banknote information and the banknote transfer information, associated with the banknote handling transfer operation, from the first circuitry;
determine, based on the stored banknote information and the banknote transfer information, a presence or absence of an occurrence of an abnormality related to banknotes in the banknote handling apparatus, the abnormality being a change of the transfer order, wherein the second circuitry determines the presence or the absence by comparing the serial numbers of the banknotes included in the stored banknote information and the banknote transfer information which banknotes are associated with the banknote handling operation, to detect banknotes which should not exist in the storage container but do exist and banknotes that should exist in the storage container but do not exist; and
generate, in a case that the second circuitry determines that there is the presence of the occurrence of the abnormality, fraud data related to the occurrence of the abnormality.

2. The banknote handling system of claim 1, further comprising:
a database configured to store the fraud data.

3. The banknote handling system of claim 1, wherein the second circuitry is configured to:
check the stored banknote information and the banknote transfer information; and
determine, in a case that a result of the check corresponds to a predetermined condition, that an abnormality occurred.

4. The banknote handling system of claim 1, wherein the fraud data includes at least one of data that specifies the banknote handling apparatus in which the abnormality occurred and data that specifies the storage container related to the abnormality.

5. The banknote handling system of claim 1, wherein the first circuitry includes a communication interface to transmit the stored banknote information and the banknote transfer information to the second circuitry.

6. The banknote handling system of claim 5, further comprising:
an information processing apparatus configured to communicate with the second circuitry via a network, wherein
the second circuitry includes a second communication interface to transmit the fraud data to the information processing apparatus.

7. A banknote handling apparatus for monitoring of each banknote handling operation to enable detection of fraud and abnormalities, the banknote handling apparatus comprising:
a plurality of storage containers that store banknotes, wherein each of the storage containers has a storage area, the plurality of storage containers including a mixed loose banknote storage container and at least one denomination-categorized loose banknote storage container, and the banknotes are stored or dispensed in a last in first out (LIFO) order;
a take-in mechanism that takes in the banknotes one by one for storage in the storage area;
a take-out mechanism that takes out the banknotes one by one from the storage area; and
circuitry configured to
control performance of a predetermined set of banknote handling transfer operations including dispensing, depositing, replenishing, collection, and inspection;
acquire, after each banknote handling transfer operation has been executed, stored banknote information and banknote transfer information associated with the banknote handling transfer operation, wherein
the stored banknote information comprises, for each of the storage containers, a denomination of each banknote, a number of banknotes in the storage container, an amount of money in the storage container, and a serial number of each banknote in a storage order in which the banknote is stored in the storage container, and
the banknote transfer information comprises, for each banknote transferred in executing a banknote handling transfer operation, a transfer source, a transfer destination, and the serial number of the banknote in a transfer order in which the banknote was transferred in execution of the banknote handling transfer operation;
determine, based on the stored banknote information and the banknote transfer information, a presence or absence of an occurrence of an abnormality related to banknotes in the banknote handling apparatus, the abnormality being a change of the transfer order, wherein the circuitry determines the presence or the absence by comparing the serial numbers of the banknotes included in the stored banknote information and the banknote transfer information which banknotes are associated with the banknote handling operation, to detect banknotes which should not exist in the storage container but do exist and banknotes that should exist in the storage container but do not exist; and
generate, in a case that that the circuitry determines that there is the presence of the occurrence of the abnormality, fraud data related to the occurrence of the abnormality.

8. The banknote handling apparatus of claim 7, wherein the circuitry is configured to:
check the stored banknote information and the banknote transfer information; and determine, in a case that a result of the check corresponds to a predetermined condition, that an abnormality occurred.

9. An information processing apparatus to communicate with a banknote handling apparatus including a plurality of storage containers that store banknotes, a take-in mechanism that takes in the banknotes one by one for storage in the storage area, and a take-out mechanism that takes out the banknotes one by one from the storage area, wherein each of the storage containers has a storage area, the plurality of storage containers including a mixed loose banknote storage container and at least one denomination-categorized loose banknote storage container, and the banknotes are stored or dispensed in a last in first out (LIFO) order, and the banknote handling apparatus configured to perform a predetermined set of banknote handling transfer operations including dispensing, depositing, replenishing, collection, and inspection, the information processing apparatus comprising:

a communication interface configured to receive, after each banknote transfer operation has been executed, stored banknote information and banknote transfer information associated with the banknote handling transfer operation, wherein the stored banknote information comprises, for each of the storage containers, a denomination of each banknote, a number of banknotes in the storage container, an amount of money in the storage container, and a serial number of each banknote in a storage order in which the banknote is stored in the storage container, and the banknote transfer information comprises, for each banknote transferred in executing a banknote handling transfer operation, a transfer source, a transfer destination, and the serial number of the banknote in a transfer order in which the banknote was transferred in execution of the banknote handling transfer operation;

circuitry configured to determine, based on the stored banknote information and the banknote transfer information that have been received by the communication interface, a presence or absence of an occurrence of an abnormality related to banknotes in the banknote handling apparatus, the abnormality being a change of the transfer order, wherein the circuitry determines the presence or the absence by comparing the serial numbers of the banknotes included in the stored banknote information and the banknote transfer information which banknotes are associated with the banknote handling operation, to detect banknotes which should not exist in the storage container but do exist and banknotes that should exist in the storage container but do not exist; and generates, in a case that the circuitry determines that the occurrence of the abnormality is present, fraud data related to the occurrence of the abnormality; and a database configured to store the fraud data.

10. The information processing apparatus of claim 9, wherein the circuitry is configured to:

check the stored banknote information and the banknote transfer information; and determine, in a case that a result of the check corresponds to a predetermined condition, that an abnormality occurred.

11. The information processing apparatus of claim 9, wherein the fraud data includes at least one of data that specifies the banknote handling apparatus in which the abnormality occurred and data that specifies the storage container related to the abnormality.

12. A method for detecting a fraud related to banknotes stored in a plurality of storage containers of a banknote handling apparatus, wherein each of the storage containers has a storage area, the plurality of storage containers include a mixed loose banknote storage container and at least one denomination-categorized loose banknote storage container, and the banknotes are stored or dispensed in a last in first out (LIFO) order, the banknote handling apparatus further comprises a take-in mechanism that takes in the banknotes one by one for storage in the storage area and a take-out mechanism that takes out the banknotes one by one from the storage area, and the banknote handling apparatus is configured to perform a predetermined set of banknote handling transfer operations including dispensing, depositing, replenishing, collection, and inspection, the method comprising:

acquiring, by the banknote handling apparatus after each banknote handling transfer operation has been executed, stored banknote information and banknote transfer information, wherein the stored banknote information comprises, for each of the storage containers, a denomination of each banknote, a number of banknotes in the storage container, an amount of money in the storage container, and a serial number of each banknote in a storage order in which the banknote is stored in the storage container, and the banknote transfer information comprises, for each banknote transferred in executing a banknote handling transfer operation, a transfer source, a transfer destination, and the serial number of the banknote in a transfer order in which the banknote was transferred in execution of the banknote handling transfer operation;

checking, by at least one of the banknote handling apparatus and an information processing apparatus different from the banknote handling apparatus, the stored banknote information and the banknote transfer information;

determining, in a case that a result of the check corresponds to a predetermined condition, that an abnormality occurred, the abnormality being a change of the transfer order, wherein the determining comprises to determine the presence or the absence by comparing the serial numbers of the banknotes included in the stored banknote information and the banknote transfer information which banknotes are associated with the banknote handling operation, to detect banknotes which should not exist in the storage container but do exist and banknotes that should exist in the storage container but do not exist; and generating, in a case that the determining indicates that there is the presence of the occurrence of the abnormality, fraud data related to the occurrence of the abnormality.

* * * * *